US007809676B2

(12) United States Patent
Chorley et al.

(10) Patent No.: US 7,809,676 B2
(45) Date of Patent: Oct. 5, 2010

(54) RULES ENGINE FOR WAREHOUSE MANAGEMENT SYSTEMS

(75) Inventors: Jon S. Chorley, Mill Valley, CA (US); Maik Zeckzer, Berlin (DE); Milan Bhatia, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 293 days.

(21) Appl. No.: 10/158,176

(22) Filed: May 29, 2002

(65) Prior Publication Data

US 2009/0070353 A1  Mar. 12, 2009

(51) Int. Cl.
*G06F 7/00* (2006.01)
*G06F 17/00* (2006.01)
*G06F 17/30* (2006.01)

(52) U.S. Cl. .................. 707/600; 707/705; 707/803
(58) Field of Classification Search ............... 707/1–10, 707/100–104.1, 200–205, 600, 705, 803; 705/1–7, 28, 30, 10
See application file for complete search history.

(56) References Cited

U.S. PATENT DOCUMENTS

| 5,249,120 | A | | 9/1993 | Foley |
| 5,675,785 | A | * | 10/1997 | Hall et al. .................. 707/102 |
| 6,356,880 | B1 | * | 3/2002 | Goossens et al. ............. 705/30 |
| 6,744,436 | B1 | * | 6/2004 | Chirieleison et al. ........ 345/427 |
| 6,829,604 | B1 | | 12/2004 | Tifft |
| 7,130,807 | B1 | * | 10/2006 | Mikurak ......................... 705/7 |
| 7,177,834 | B1 | | 2/2007 | Maestle |
| 7,302,409 | B2 | | 11/2007 | Hayashi |
| 2002/0107864 | A1 | * | 8/2002 | Battas et al. ................. 707/101 |
| 2002/0111886 | A1 | * | 8/2002 | Chenevich et al. ............ 705/30 |
| 2003/0002445 | A1 | | 1/2003 | Fullana et al. |
| 2003/0018516 | A1 | * | 1/2003 | Ayala et al. .................... 705/10 |
| 2003/0018546 | A1 | * | 1/2003 | Ayala et al. .................... 705/28 |
| 2003/0083888 | A1 | | 5/2003 | Argenton et al. |
| 2003/0115080 | A1 | * | 6/2003 | Kasravi et al. ................. 705/1 |
| 2003/0120504 | A1 | * | 6/2003 | Kruk et al. ..................... 705/1 |
| 2003/0172008 | A1 | | 9/2003 | Hage et al. |
| 2003/0216977 | A1 | | 11/2003 | Hayashi |
| 2006/0155655 | A1 | | 7/2006 | Shen |
| 2007/0239569 | A1 | * | 10/2007 | Lucas et al. ................... 705/28 |

FOREIGN PATENT DOCUMENTS

EP  1362542 A1  11/2003

* cited by examiner

*Primary Examiner*—Khanh B Pham
*Assistant Examiner*—Navneet K Ahluwalia
(74) *Attorney, Agent, or Firm*—Townsend and Townsend and Crew, LLP

(57) ABSTRACT

A novel rules engine which automates many warehouse processes, and provides for efficient management of a warehouse. The rules engine provides a flexible and customizable structure for modeling the many different types of processes governing the function of a warehouse. The rules engine translates business level logic into code for manipulating the warehouse database. The rules engine allows a user to create their own user logic for working with the database, which operates at a level of abstraction more feasible for the user. The rules engine understands the user logic by the way the user decides how to string various restrictions together. The rules engine implements the translation via its internal understanding of the structure of the particular application. Thus, the rules engine allows the user to define logic without understanding how to manipulate a database.

30 Claims, 13 Drawing Sheets

CRITERIA PRIORITY FORM

RULE TYPE: PICK — 800

CRITERIA — 810

| CRITERIA ORDER | CRITERIA NAME | CRITERIA DESCRIPTION |
|---|---|---|
| 10 | CUSTOMER | CUSTOMER |
| 20 | ORGANIZATION | SOURCE ORGANIZATION |

820

AVAILABLE CRITERIA

| NAME | DESCRIPTION |
|---|---|
| CUSTOMER | CUSTOMER |
| ITEM | INVENTORY ITEM |
| ITEM CATEGORY | INVENTORY CATEGORY |
| ORGANIZATION | SOURCE ORGANIZATION |
| TRANSACTION TYPE | TRANSACTION TYPE |

SUB-CRITERIA PRIORITY FORM

CRITERIA NAME: CUSTOMER
CRITERIA DESCRIPTION: CUSTOMER

SUB-CRITERIA

| SEQUENCE | SUB-CRITERIA NAME | SUB-CRITERIA DESCRIPTION |
|---|---|---|
| 10 | RESTAURANTS & RETAILERS | CUSTOMER |
| 20 | JAM MANUFACTURERS | CUSTOMER |

FIG. 8A

DEFINING SOLUTIONS FORM

| | | |
|---|---|---|
| RULE TYPE: | PICK | ⟵ 800 |
| SOLUTION NAME: | EXCELLENT & FEFO | ⟵ 830 |
| SOLUTION DESCRIPTION: | PICK FOR GRADE EXCELLENT, SORT BY FEFO | ⟵ 840 |

860 ⟶ ☐ USER DEFINED  ☐ ENABLE  ☐ COMMON FOR ALL ENTITIES
870 ⟶ ☐ MINIMUM PICK TASK   850      880

— 890

| RESTRICTIONS | SORT | CONSISTENCY | | | | |
|---|---|---|---|---|---|---|
| SEQUENCE | AND/OR | ( OBJECT | PARAMETER | OBJECT VALUE | PARAMETER VALUE | QUANTITY/RETURN ) |
| 10 | - | LOT | GRADE CODE | CONSTANT C | EXCELLENT | |

900 / 910   915 \ 920  \ 930  \ 940    \ 960    \ 965  970

---

DEFINING SOLUTIONS FORM

| | |
|---|---|
| RULE TYPE: | PICK |
| SOLUTION NAME: | EXCELLENT & FEFO |
| SOLUTION DESCRIPTION: | PICK FOR GRADE EXCELLENT, SORT BY FEFO |

☐ USER DEFINED  ☐ ENABLE  ☐ COMMON FOR ALL ENTITIES
☐ MINIMUM PICK TASK

| RESTRICTIONS | SORT | CONSISTENCY | |
|---|---|---|---|
| SEQUENCE | OBJECT | PARAMETER | ORDER |
| 10 | LOT | EXPIRATION DATE | ASCENDING |

FIGURE 8B

STRATEGY FORM

RULE TYPE: PICK — 800
SOLUTION NAME: EXCELLENT/GOOD — 980
SOLUTION DESCRIPTION: PICK EXCELLENT GRADE, THEN GOOD GRADE — 990

☐ USER DEFINED   ☐ ENABLE
   1000             1010
                                                              — 1020

| SEQUENCE | SOLUTIONS | PARTIAL SUCCESS ALLOWED | EFFECTIVE DATE DATE TYPE | FROM | TO |
|---|---|---|---|---|---|
| 10 | EXCELLENT & FEFO | YES | ALWAYS | | |
| 20 | GOOD & FEFO | YES | ALWAYS | | |

STRATEGY ASSIGNMENT FORM

CRITERIA NAME: CUSTOMER — 1060
SUB-CRITERIA NAME: RESTAURANTS & RETAILERS — 1070

| SEQUENCE | RULE TYPE | STRATEGY NAME | EFFECTIVE DATE DATE TYPE | FROM | TO |
|---|---|---|---|---|---|
| 10 | PICK | EXCELLENT/GOOD | ALWAYS | | |

RULES ENGINE FOR WAREHOUSE MANAGEMENT SYSTEMS

FIELD OF THE INVENTION

The present invention relates to management of warehouse functions, and more particularly to computer program-implemented management of warehouse functions.

BACKGROUND OF THE INVENTION

Material handing rules, customer requirements, storage constraints, and efficiency, place complex demands on the modern warehouse. Warehouse management systems enable a warehouse to dispatch tasks and manage inventory. Currently many decisions within a warehouse, however, are left for an operator and/or supervisor to perform, demanding a high degree of training, but still yielding sub-optimal results and occasionally, serious mistakes.

A common warehouse management system 10 is illustrated in FIG. 1. The system has a number of system defined rules 20. The rules execution function 40 uses the attributes of a specific request 30 and an applicable system defined rule to manipulate a database 50 containing such information as quantity of inventory, location of inventory, etc. The warehouse management system 10 then provides the user with a solution 60. For example, a particular item may have just been received. The user can enter the description of the item, and the warehouse management system will tell the user where current stock of the same item is located, so that the new quantity can be added to the existing quantity in the same location.

Effectiveness can be increased by customizing the warehouse management system in accordance with the users specific business, processes, and needs. Customization in traditional systems entails going back to the software vendor or a third party, to make modifications to the system defined rules and or adding additional rules to model processes of the specific user. However such customization results in increased systems costs, difficulty in upgrading, and may also make it difficult for the user to change their area or way of business in response to changing customer needs.

SUMMARY OF THE INVENTION

The present invention enables the efficient management of inventory, personnel and space in a warehouse or supply chain. A rules engine, in the warehouse management system, provides a flexible and customizable repository for modeling many different types of processes used to effectively manage a warehouse. A warehouse management system is then able to provide intelligent solutions in response to requested actions performed in the warehouse. Thus a decision making process of warehouse management systems is automated, removing it from the operator and thereby reducing mistakes and increasing efficiency.

Intelligent solutions are obtained from manipulation of a warehouse database, by the rules engine. The rules engine allows each individual warehouse to create rules to model the processes followed by the warehouse. The rules engine is also able to execute the rules, which manipulate the warehouse database to find intelligent solutions.

In one embodiment, the present invention is implemented as a process for obtaining intelligent solutions for management of warehouse functions. The process of obtaining intelligent solutions includes the steps of receiving a request to perform an action in the warehouse. The request to perform an action is comprised of a list of attributes, which act to characterize the requested action. A hierarchical search, based upon the specific attributes, is then performed on a database. The database contains various information about the items in a warehouse. An intelligent solution is provided based upon information contained in the database, which best matches, the attributes of the requested action.

In so doing, the rules execution function intelligently: suggests material allocations for picking, suggests put away locations for LPNs, assigns tasks to resources with appropriate training and equipment, assigns cost groups to transactions, and assures internal, customer, and carrier compliant labels.

In a second embodiment of the present invention, a warehouse management system provides a means for obtaining an intelligent solution to a requested management action performed in the warehouse. The warehouse management system includes a means for defining rules to model the requested management action based upon logic defined by the user. The warehouse management system also includes a means for manipulating a database. The database contains elements describing the items contained in the warehouse. The method of manipulating the database is based upon the defined rules and the requested management action.

In a third embodiment of the present invention, a warehouse management system provides for a rules creation function and a rules execution function. The rules creation function is capable of translating user defined logic, which models warehouse processes, into user defined rules. The rules execution function is capable of manipulating a database, containing information about the contents of a warehouse, according to the user defined rules and system defined rules. The manipulation of the database according to the user defined rules and system defined rules provides the rules execution function with the ability to provide intelligent solutions to a requested action.

In so doing, the rules execution function processes requests by starting at a highest priority criteria of an applicable rule, and continues searching in the order of priority unit a matching criteria is found or until it reaches a lowest priority criteria. The rules execution function then searches a strategy associated with the matching criterion. Additional attributes of the request and strategy sequence determine which strategy is selected for the matching criteria. The rule execution function then searches one or more solutions associated with the matching strategy using additional attributes and solution sequence. The solution selected is the one or more solutions that satisfy all the restrictions of the rule.

In a forth embodiment of the present invention, automated management of a warehouse is implemented by creating user defined rules. The user defined rules, along with system defined rules are then executed to obtain an intelligent solution.

In fifth embodiment of the present invention, a process for creating user defined rules is implemented by defining one or more solutions and selecting one or more criteria. The criteria are the standards or tests upon which the user defined rules select a particular solution.

In a sixth embodiment of the invention, user defined rules are created in a hierarchical structure that allows for efficient operation. Creating a rule is divide into four main steps: identifying a rule type; selecting and prioritizing one or more criteria, defining one or more strategies for each of the selected criteria, and finally defining one or solutions for each of the selected criteria and or solutions.

BRIEF DESCRIPTION OF THE DRAWINGS

The present invention is illustrated by way of example and not by way of limitation, in the figures of the accompanying drawings and in which like reference numerals refer to similar elements and in which:

FIGS. 8A-8D shows an example of a possible graphical user interface implementation of a rules creation function, according to another embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Figure 1:
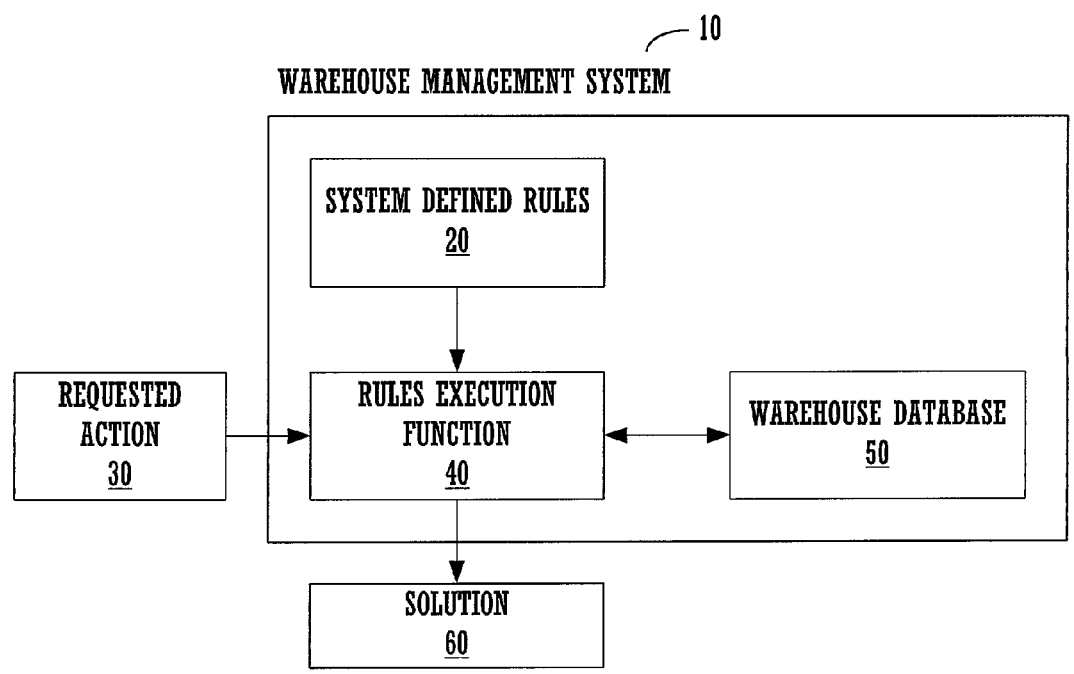
FIG. 1 shows a block diagram of a warehouse management system, according to the prior art.
Figure 2:
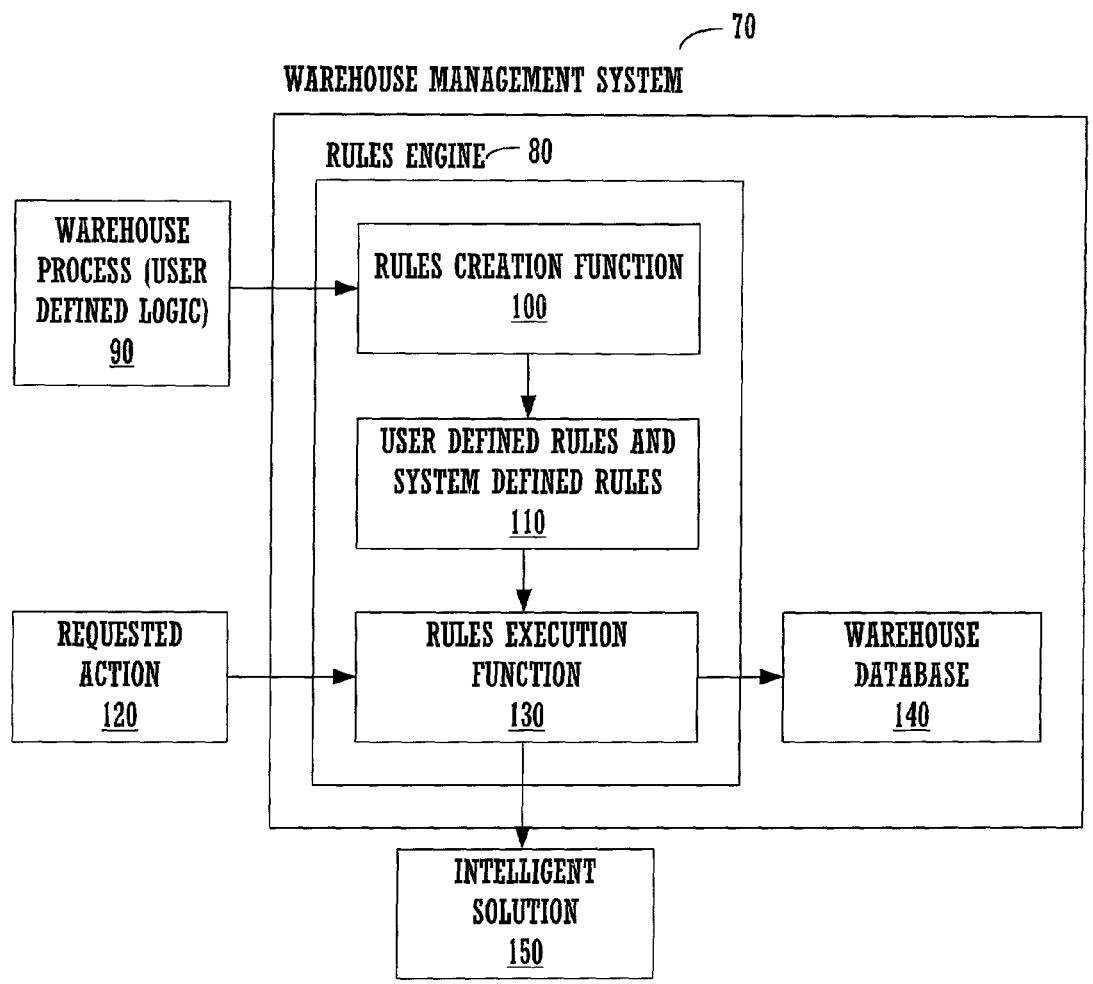
FIG. 2 shows a block diagram of a warehouse management system, according to one embodiment of the present invention.

Referring now to FIG. 2, a diagram of a warehouse management system 70 in accordance with one embodiment of the present invention is shown. The warehouse management system 70 includes a rules engine 80 communicatively coupled to a warehouse database 140. The rules engine includes a rules creation function 100, one or more user defined rules & system defined rules 110, and a rules execution function 130.

The rules engine 80 provides an intelligent solution 150 in response to a requested action 120 performed in the warehouse. The intelligent solution 150 is obtained by manipulation of the warehouse database 140 by the rule rules execution function 130, based upon the user defined rules and or system defined rules 110. The user defined rules and system defined rules 110 are capable of modeling any warehouse process 90. The warehouse database 140 contains information about the contents of a warehouse and elements describing them.

The rules engine 80 has two primary features: a rules creation function 100 and a rules execution function 130. The rules creation function 100 is used to create user defined rules that model the various warehouse processes 90 (also referred to as user defined logic). The rules execution function 130 uses the user defined rules and system defined rules 110, along with the attributes of a requested action 120, to manipulate the warehouse database 140 in order to provide the intelligent solution.

Figure 3:
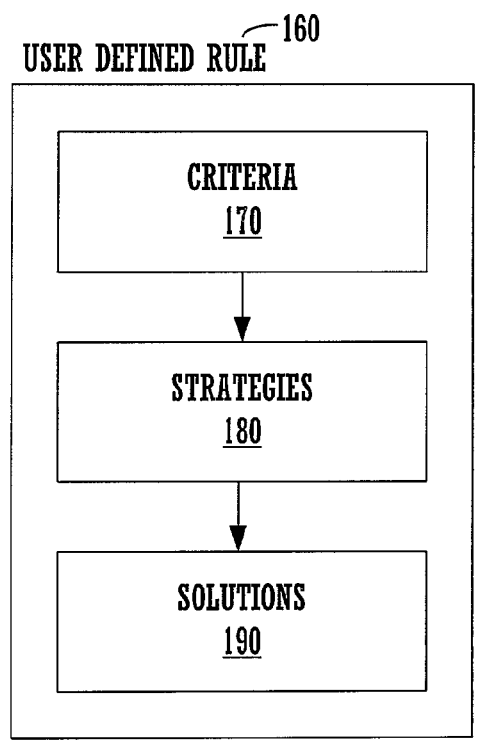
FIG. 3 shows a hierarchical structure of a possible user defined rule.

FIG. 3 shows a hierarchical structure of a user defined rule 160, in accordance with another embodiment of the present invention. The user defined rule 160 includes one or more criteria 170, one or more strategies 180, and one or more solutions 190.

The user defined rule consists of a complete relationship between the criteria 170, strategies 180, and solutions 190, used to fulfill a particular warehouse process. The relationship between each level of the hierarchical structure consists of one or more restrictions. A user defined rule can be based on nearly any field in a warehouse database.

Figure 4:
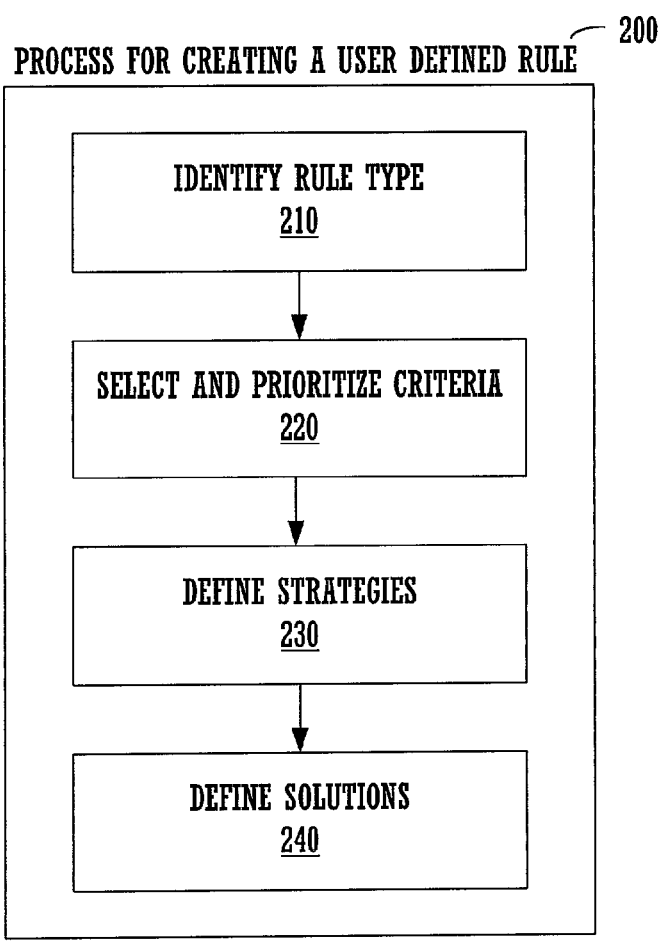
FIG. 4 shows a flow diagram of a process for creating a user defined rule, according to another embodiment of the present invention.

FIG. 4 shows the process of creating a user defined rule 200 as implemented by a rules creation function, in accordance with one embodiment of the present invention. The process of creating a user defined rule 200 includes: identifying the rule type 210; selecting applicable criteria, and prioritizing the criteria 220; defining strategies for each criteria 230; and finally defining solutions 240.

The rule type 210 is the name of the rule that implements a particular warehouse process, such as pick, put away, task type assignment, cost group assignment, or label format assignment.

The criteria 220 used for each rule type are then selected. Criteria are the standards on which judgments or decisions are based. Examples of iii criteria may include: Item category, item, customer, freight carrier, order type, default, etc. It is also possible to define and sequence any sub-criteria, such as perishable, summer seasonal, winter seasonal, for a criterion such as item category. Not all the available criteria need to be assigned in the rule type. In fact, it is unlikely that an organization will need more than three or four criteria in each rule. Next the criteria need to be prioritized. The most specific criteria is designated as having the highest priority, with the next less specific criteria given the next highest priority, until the most general criteria is given the lowest priority. The priority determines the order in which a rules execution function will search for a criterion that matches one or more attributes of a requested action.

Figure 5:
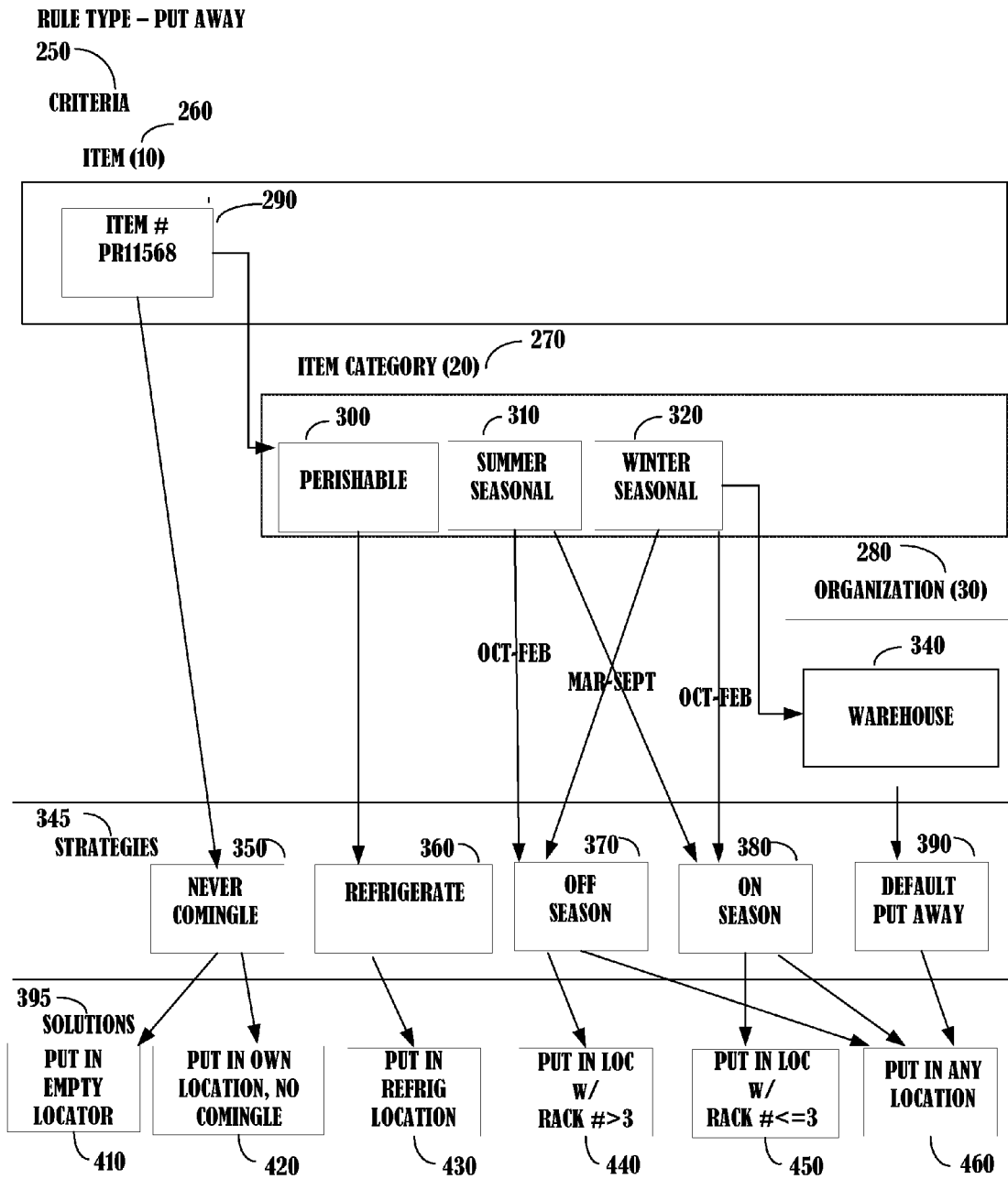
FIG. 5 shows a hierarchical structure of a possible user defined rule created by a rules creation function. According to another embodiment of the present invention.

An example of a possible user defined rule is depicted in FIG. 5. The example illustrates the selection of three criteria: item 260, item category 270, and organization 280. Item category has three sub-criteria sequenced in the order of perishable 300, summer seasonal 310, winter seasonal 320. Item 260 is the most specific criteria and is thus assigned the highest priority, denoted by (10). Item category 270 is assigned an intermediate priority, denoted by (20). Organization 280 is the most general criteria and is thus assigned the lowest priority, denoted by (30).

The strategies are an ordered sequence of solutions that are used to try to fulfill complex requested actions. Strategies are defined, such as quality, never comingle, refrigerate, off season, on season, default put away, etc. The strategies are then associated with the applicable criteria. Common occurrences of strategies can be combined, potentially creating a many to many relationship.

For example, FIG. 5 shows the defining of five strategies: never comingle 350, refrigerate 360, off season 370, on season 380, default put away 390. Each strategy is associated with applicable criteria. The summer seasonal 310 and winter seasonal 320 criteria each have common occurrences of the on season 380 and off season 370 strategies. Therefore the two on season and two off season strategies can be combined creating multiple to multiple relationships with summer and winter season criteria.

Solutions are then defined and are associated with applicable strategies or criteria. Sequencing of the solutions will determine the order chosen. Again, common occurrences of solutions can be combined, potentially creating a many to many relationship.

For example, FIG. 5 shows the defining of six solutions: put in empty locator 410, put into any location but do not comingle 420, put into refrigerated location 430, put into location with rack #>3 440, put in location with rack #<=3 450, put into any locator 460.

As can be seen from FIG. 5, the solutions along with permitted associations between solution and strategy, strategy and criteria, and solution and criteria, represent the various restrictions of a rule.

The schematic represented by FIG. 5, however, would grow to complex to construct for all but the simplest cases. In another embodiment of the invention, a navigator-like approach can be taken, instead, to map out real-life systems. For example:

---

Rule Type
   Criteria
      Sub-Criteria
         Strategy
            Solution

---

The example of FIG. 5 can be mapped out as:

---

Put Away Rules
  (10) Item
      PR11568
         (10) Never Commingle Strategy
            (10) Put away into empty locator
            (20) Put away into any locator, do not
                commingle
  (20) Category
      Perishable
         (10) Refrigerated Strategy
            (10) Put into refrigerated locator
      Summer Seasonal
         (10) On Season Strategy (mar-sep)
            (10) Put away into locator with rack > 3
            (20) Put away into any locator
         (20) Off Season Strategy (oct-feb)
            (10) Put away into locator with rack <=3
            (20) Put away into any locator
      Winter Seasonal
         (10) On Season Strategy (oct-feb)
            (10) Put away into locator with rack <=3
            (20) Put away into any locator
         (20) Off Season Strategy (mar-sep)
            (10) Put away into locator with rack > 3
            (20) Put away into any locator
  (30) Default
      Default -continued

(10) Default Put Away Strategy
    (10) Put away into empty locator
    (20) Put away into any locator, do not
        commingle
    (30) Put away into any locator

---

To read the navigator-like text schematic, one searches down the hierarchy of criteria until an attribute of the requested action matches. The first strategy that is applicable and currently effective for the matching criteria is selected. Then one goes down the solutions of the strategies in order. The numbers in parentheses indicates the priority of the corresponding criterion or the sequence of the strategy or solution.

Figure 6:
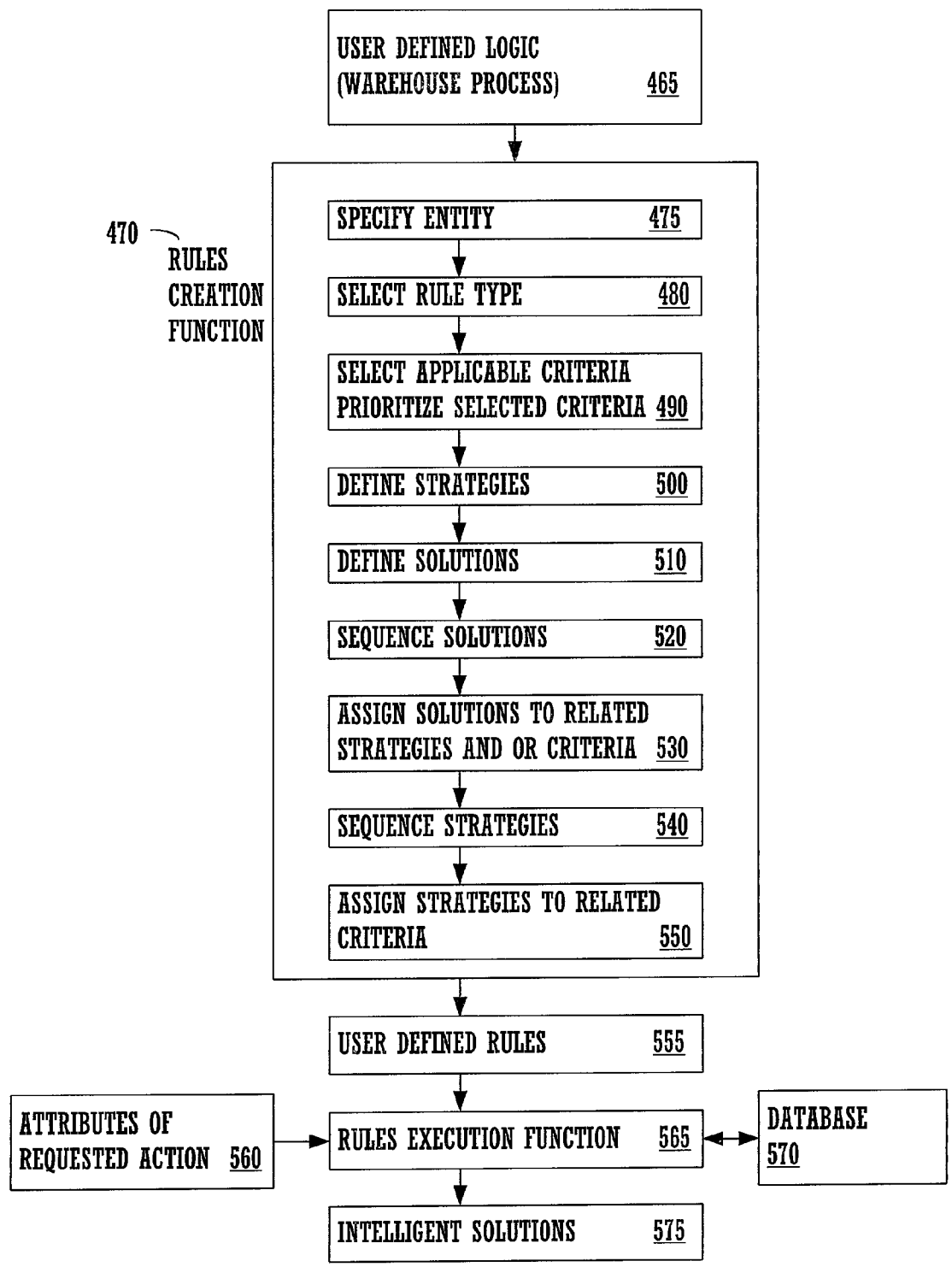
FIG. 6 shows a flow diagram of a second embodiment of a warehouse management system.

FIG. 6 shows a warehouse management system in accordance with an alternative embodiment of the present invention. A rules creation function 470 receives user defined logic 465 and creates user defined rules 555 therefrom. A rules execution function 565 uses the user defined rules 555 to manipulate a database 570 in order to provide an intelligent solution 575 in response to one or more attributes of a requested action 560.

The rules creation function 470 is used to perform the following steps to create the user defined rules 555: specify an entity 475, select a: rule type 480, select applicable criteria and prioritize the selected criteria 490, define one or more strategies 500, define one or more solutions 510, sequence the solutions 520, assign the solutions to the related strategies and or the criteria 530, sequence the strategies 540, and assign the strategies to the related criteria 550.

The rules creation function can be used to obtain an integrated warehouse management systems across a full chain of related entities. For example, the management systems for the raw material supplier, manufacturer, distributor, carriers, and other entities, could be integrated. Therefore, the rules creation function 470 also provides for specifying the entity for each rule type.

Figure 7:
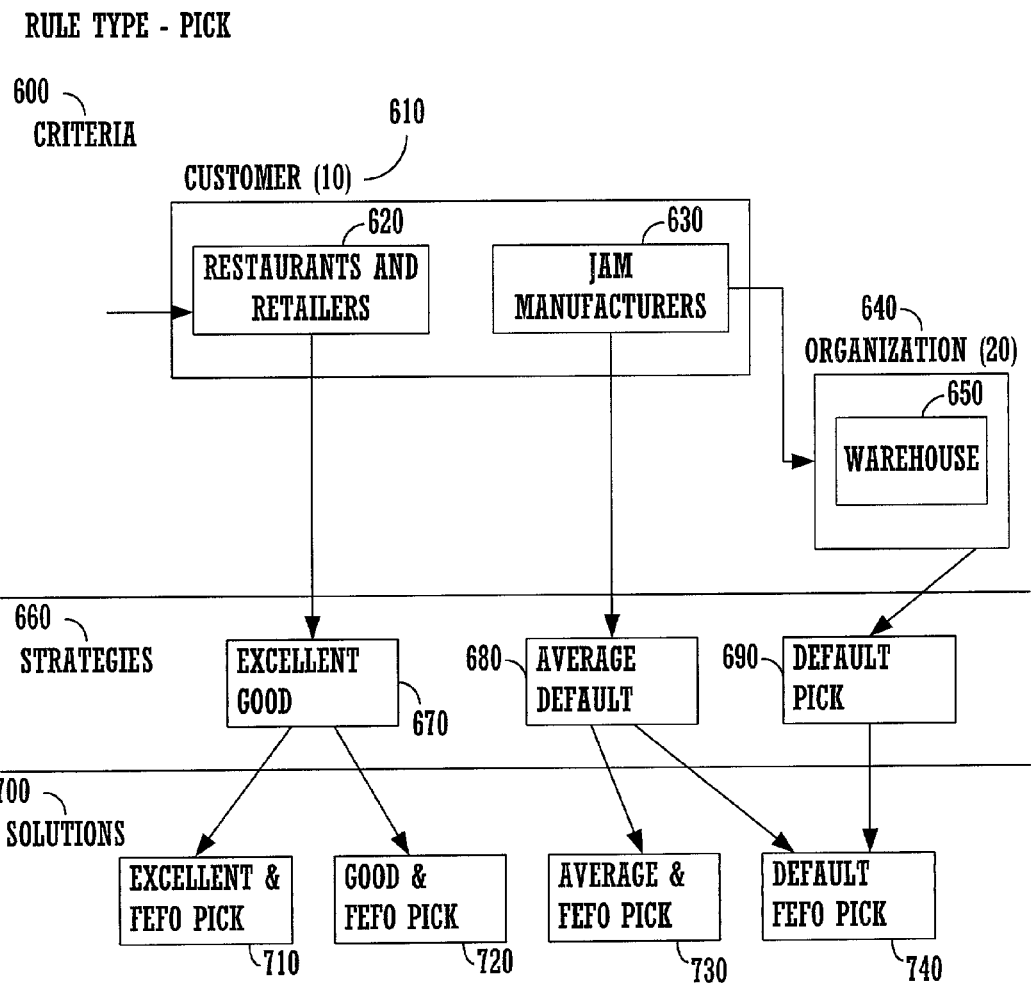
FIG. 7 shows a hierarchical structure of a possible user defined rule created by a rules creation function, according to another embodiment of the present invention.

FIG. 7 illustrates a possible picking rule used by a warehouse that carries strawberries. An example of user defined logic for picking strawberries can be summarized as including restrictions based upon quality and expiration, and restrictions based upon the customer. For example strawberries have lot grades of Excellent, Good, and Average. Restaurants and Retailers require Excellent strawberries when available, and Good strawberries only if necessary. However, Jam Manufacturers only need Average strawberries. The Warehouse wants to fill orders on a first expired first out (FEFO) basis.

In the above example, the warehouse's requirements (Organization 640) are the most general. Specific customers have more restrictive requirements. Therefore, the Customer criterion 610 is selected and given highest priority. The Customer criterion 610 has Restaurants & Retailers 620, and Jam Manufacturer 630 sub-criteria. The Restaurants & Retailers 620 sub-criterion is sequence before the Jam Manufacture 630 sub-criterion because it is more restrictive.

The strawberry example requires four solutions. First the Restaurants & Retailers require picking of Excellent strawberries and the warehouse wants to fill the order on a FEFO (First Expire First Out) basis. If Excellent strawberries are not available they will accept Good strawberries. Again the warehouse will want to fill the order on a FEFO basis. Because Jam Manufactures only need Average strawberries, the warehouse will want to try to fill the order with Average strawberries, but will supply Good or Excellent if necessary. In the absence of the above requirements, the warehouse will supply strawberries on just a FEFO basis. This leads to four solutions: Excellent & FEFO pick 710, Good & FEFO pick 720, Average & FEFO pick 730, Default FEFO pick 740.

The requirements of the Restaurants & Retailers can first be satisfied by the Excellent & FEFO pick and then by the Good & FEFO pick. The Jam Manufacturers requirements can be satisfied by the Average & FEFO pick and then by the Default FEFO pick. The warehouses restrictions are simply satisfied by the Default FEFO pick. Therefore, three strategies are required: Excellent/Good 670, Average/Default 680, and Default 690.

FIGS. 8A-8D depict a possible graphical user interface implementation for using a rules creation function in accordance with an embodiment of the present invention. FIG. 8A shows two view of a criteria priority form. The first view is used to select and prioritize applicable criteria; while the second view is used to specify and sequence sub-criteria. FIG. 8B shows two views of a defining solutions form. The first view is used to define solutions; while the second view is used to sort the solutions. FIG. 8C is a strategy form. The strategy form is used to define strategies and associate the defined solutions with the defined strategies. FIG. 8D is a strategy assignment form. The strategy assignment form is used to assign the defined strategies to the selected criteria. Furthermore, the rule creation function illustrated in FIGS. 8A-8D corresponds to the picking rule in FIG. 7.

First, criteria priority form, FIG. 8A, is used to specify criteria and their priority for each rule type. The rule type is specified 800, then the specific criteria may be selected from a list of criteria, or may be defined in the Name and Description columns 810. Priority is assigned to each criterion in the Priority column of the form 820. The priority numbers need not be consecutive. The criteria with the lowest priority number will be examined first, the criteria with the next lowest priority number will be examined next, and so forth. Multiples of ten can be used at first to allow easy insertion of criteria in the future without having to reassign all the priority numbers. It is also possible to specify sub-criteria for each selected criteria.

FIG. 8A illustrates the selection and sequencing of the criteria for picking of strawberries. The Customer criteria is selected and given highest priority. The Organization is also selected, from the list of available criteria, and assigned lowest priority. The Restaurant & Retailers and Jam Manufacturers sub-criteria for the Customer criterion are also specified.

Next the various solutions are created using the defining solutions form, FIG. 8B. The rule type is specified 800, then a solution name and a description of the solution is designated 830, 840. The body of the solution is then entered 900. Each row corresponds to an element, and multiple rows can be joined with AND and OR operators 915. By entering opening and closing parentheses at the beginning and ending of lines 920 970, complex compound statements can be formed. The sequence column 910 is used to specify the sequence in which the elements are linked together. The sequence numbers need not be consecutive. The element with the lowest sequence number will be examined first, the element with the next lowest sequence number will be examined next, and so forth. Multiples of ten can be used at first to allow easy insertion of elements in the future without have to reassign all the element numbers.

Objects 930 and parameters 940 form the heart of each line, and may be based on any field in a database. The objects 930, parameters 940, and their value fields 960 are context sensitive, so that only parameters particular to the selected object can be selected, and the user will only be prompted for a value if it is necessary. A quantity function 965 is specified for picking and put away rules, or a return value is specified for cost group, task, and label format rules.

The sort tab 890 allows the list of locators, for a pick or put away task, to be sorted. The objects and parameters that can be used to specify sortation are a subset of those for which restrictions can be specified. Multiple sort criteria, such as FIFO and FEFO, can be used to break ties at lower levels.

The rules engine comes preconfigured with several basic solutions. These solutions will not have the user defined checkbox 860 checked, and they cannot be edited. Solutions that are user defined can be edited, as long as they are not enabled 850, and the user defined checkbox cannot be unchecked. When solutions are enabled via the checkbox, they can be assigned to strategies, but enabled solutions cannot be edited. Upon enabling the solution, the solution will be checked for correct syntax.

Solutions can be either entity (i.e. warehouses and the like) specific, or shared between entities by checking the common for all entities checkbox 880. For pick, put away, and cost group rules, making solutions common to all entities does not necessarily mean that all entities use that solution, only that it is possible for a strategy in another entity to use that solution. However, for task type and label format rules, making solutions common to all entities means that all entities use that solution, as there are no strategies or criteria assignment for these types of solutions.

The minimum pick task button 870, available only for a picking task solution, attempts to minimize the number of picks required for a task, subject to the restrictions, but regardless of the sort criteria. Units of measure and unit of measure conversions are defined in the units of measure form, and assigned to the subinventory as the pick unit of measure.

FIG. 8B illustrates the defining of the Excellent & FEFO solution for the strawberry example.

Third, strategies are constructed from one or more solutions. Strategies are a sequence of solutions that will be tried to allocate material or space to fulfill a request. Solutions can be reused for multiple strategies. Solutions can also be valid only during specific period of time.

As illustrated in the strategies form, FIG. 8C, the rule type 800 is specified along with specifying the strategy 980 and a description of the strategy 990. The applicable previously defined solution names are then specified 1030. The sequence number 1040 specifies the order in which the solutions are executed. The sequence numbers need not be consecutive. The solution with the lowest sequence number will be examined first, the solution with the next lowest sequence number will be examined next, and so forth. Multiples of ten can be used at first to allow easy insertion of solutions in the future without have to reassign all the sequence numbers.

The solutions available to be assigned to the particular strategy are only those solutions that are of the same rule type as the strategy, and are further limited by the current organization.

Solutions can also be valid only during specific period of time 1020. Always is also an option for the effective date. The user defined check box 1000 is identical to the one in the solutions form. Preconfigured strategies cannot be modified. When a strategy is enabled 1010, it cannot be changed. Furthermore, solutions that are used in an enabled strategy cannot be disabled. All strategies that used a particular solution must be disabled before the solution is disabled, this prevents potential data corruption problems.

FIG. 8C, illustrates the defining of the excellent/good solution, and the assigning of the Excellent & FEFO pick and Good & FEFO pick to the solution.

Finally, strategies are assigned to criteria using the strategy assignment form, FIG. 8D. A criteria selected in the criteria priority form is specified 1060, along with the sub-criteria if applicable 1070. As before, sequence numbers 1080 are used to order the strategies. Strategies of different types can be assigned to the same criteria. However, the rules engine stops searching for a strategy when it comes to the first applicable strategy. Therefore, if multiple strategies of the same type are effective during the same period, only the one with the lowest sequence number will be selected.

FIG. 8D, illustrates the assigning of the Excellent/Good strategy to the Restaurants & Retailers sub-criteria of the customer criteria.

The implementation of translating the above specified logic into code for use by the rules engine is well know to persons in the art, and therefore will not be described.

In another embodiment of the invention, a rules execution function is capable of utilizing a user defined rule in response to a requested action to manipulate a warehouse database. The rules execution function is then able to provide an intelligent solution.

The rules execution function processes the requested action, by comparing the attributes of the requests to the criteria of an applicable rule. The rules execution function starts at the highest priority criteria, and continues searching in the order of priority until a criterion matching an attribute is found or until it reaches the lowest priority criteria. Additional attributes and strategy sequence determine which strategy is selected for the matching criterion. The rules execution function then searches the solutions associated with the matching strategy using additional attributes and solution sequence. The solution selected is one or more solutions that satisfy all the restrictions of the rule.

In an alternative feature, if a "Partial Success Allowed" box on the strategy is checked, then the rules execution function goes through all the solutions in a strategy in sequence until it allocates the entire request. For example, the rules execution function will go through all the solutions in a strategy until enough material is found in the locators to fulfill the pick request. Similarly, the rules execution function will go through all the solutions in a strategy until enough capacity is found for the put away task.

Using the strawberry example, of FIG. 7, the warehouse receives a request for 3 cases of strawberries from a restaurant. The warehouse actually has 8 cases of excellent strawberries, 6 cases of good strawberries, and 10 cases of average strawberries as indicated in the database. For this example, the rules execution function finds a match between the restaurant attribute of the request and the Customer 610 criterion, Restaurants & Retailers sub-criterion 620 of the rule. Therefore, the rules execution function proceeds to the Excellent/Good strategy 670. The strategy specifies that excellent strawberries will be picked first based upon the FEFO requirement of the warehouse 710. The rules execution function will output a pick request for the 3 of the 8 cases of excellent strawberries that will expire first.

Next the warehouse receives a request for 14 cases of strawberries from a jam producer. The rules execution function starts with the Customer criterion 610, first looking at the Restaurants & Retailers sub-criteria 620. Because the Restaurants & Retailers sub-criteria 620 does not match the jam producer attribute of the request, it will proceed to the next sequenced sub-criteria, Jam Manufacturer 630. A match is found and the Average/Default strategy 680 is selected. The Average & FEFO pick solution 730 will be used first to fill the order. However, there are only 10 cases of Average strawberries. Therefore, the rules execution function will also use the Default FEFO pick 740 to satisfy the order. The four cases of good strawberries that expire first will be selected to complete the order.

For pick and put away tasks, the rules execution function stops going through additional solutions as soon as the entire task has been allocated. If a pick or put away task cannot be fully allocated within a solution, partial success will allow a task to be allocated across several solutions.

In the case of a cost group assignment rule, the rules execution function returns a value as soon as the rules execution function comes to a solution where all the restrictions pass. For task type and label format assignments, the rules execution function goes through all solutions available under the criteria, in the specified sequence.

The rules execution function stops searching for a strategy when it comes to the first applicable strategy. Therefore if multiple strategies of the same type are affective during the same period, only the one with the lowest sequence number will be selected.

For the assignment type rules, the rules execution function returns a single value which is the type of label to be used, type of resource required for the task, or the cost group to be assigned to the transaction.

For any move request, there must be applicable picking and put away rules. The rule execution function requires both picking and put away rules for every move order in order to ensure that a suggestion is never made to pick material that is unavailable or to place material in an area without adequate capacity.

Unless the request should fail if specific restrictions are not met, and the task to unallocated or unassigned, a general default solution should always be the last solutions in the strategy or criteria.

Figure 9:
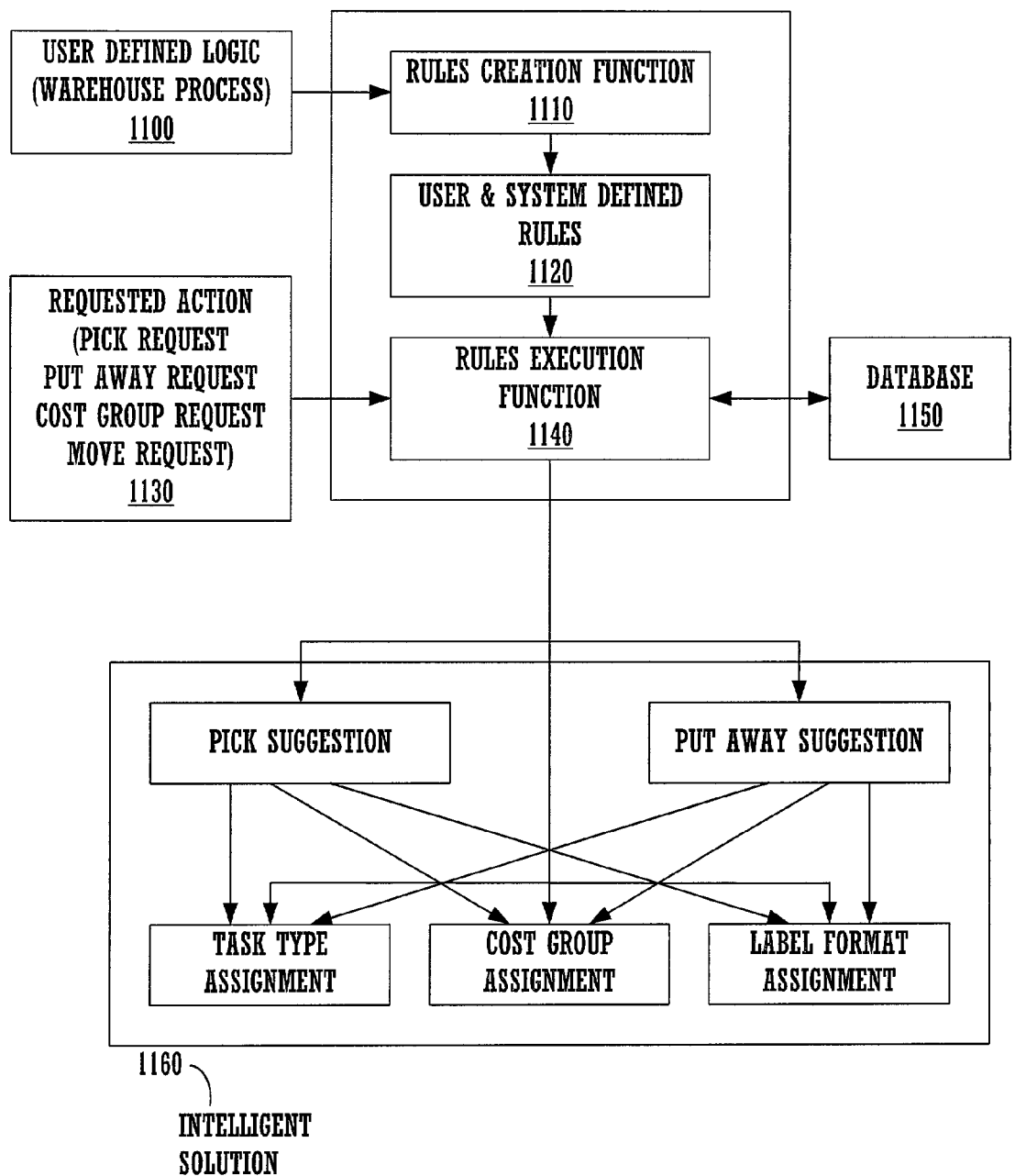
FIG. 9 shows a block diagram of a warehouse management system, according to another embodiment of the present invention.

FIG. 9 shows another embodiment of the warehouse management system. A rules creation function 1110 receives user defined logic 1100 for implementing various warehouse processes. The rules creation function 1110 creates user defined rules 1120 from the user defined logic 1100. The warehouse management system also comes preconfigured with system defined rules 1120. A rules execution function 1140 manipulates a database 1150 in response to a requested action 1130 and an applicable user defined rule or system defined rule 1120. The rules execution function 1140 outputs an intelligent solution as a result of manipulating the database 1150. The requested action 1130 can be any of a pick request, put away request, cost group request, move request, or any other action to be performed in the warehouse. While the intelligent solution 1160 can be one or more pick suggestions, put away suggestions, task type assignments, cost group assignments, label format assignments, or any other action performed in the warehouse.

Thus the warehouse management system provides for intelligent: picking; putting away; assigning transactions to cost groups; ensuring internal, carrier, and customer compliant labeling; assigning tasks to a resource with appropriate training or equipment; or any other process necessary to the operation of a warehouse.

For example, the rules engine provides for intelligent solutions for put away location of new material, based upon virtually any user defined logic. Some possibilities include: minimizing item fragmentation, requiring no lot commingling in a locator, directing hazardous materials to a corresponding hazardous storage location, or placing season items in a sub-inventory department depending on time or year.

Picking rules can also be created to factor any user defined logic. Some examples are to ensure stock rotation, or to meet customer requirements such as stock condition or quality, lot expiration date, or country of origin. Other logic examples include: first in first out (FIFO), first expired first out (FEFO), picking to deplete a location in order to free up additional warehouse space, or by cost group ownership, customer requirements that an entire order be filled by a single lot, or warehouse preferences that an item be picked from a single location can also be factored.

Some examples of task type assignment logic that can be factored include: personnel skill sets, equipment requirements and capacity. For instance, hazardous tasks can be assigned only to personnel with the appropriate training received to work with hazardous goods, while put away to the top rack can be limited to personnel who operate high-reach forklifts.

Cost group assignments can be based upon: sales channels such as internet order and in-store orders, vendor site, item categories such as refurbished, consigned, and company owned inventor, or even by item.

User defined logic can also be used to select the appropriate label format, type, and printer, based on customer, carrier, item category, or transportation method. Other criteria may include: barcode symbologies, label durability, and lot control.

Figure 10:
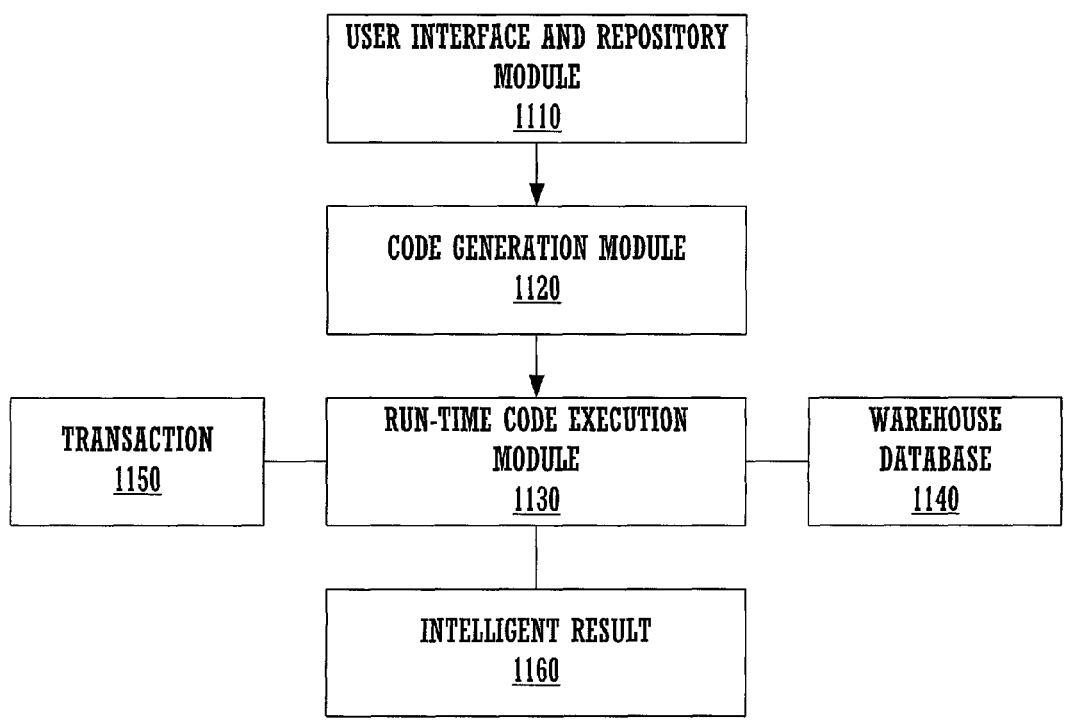
FIG. 10 shows a block diagram of a warehouse management system, according to another embodiment of the present invention.

FIG. 10 shows another embodiment of the warehouse management system. The warehouse management system comprises a user interface and repository module 1110, a code generation module 1120, and a run-time code execution module 1130. The user interface and repository module 1110 supports the definition and storage of business rules. The code generation module 1120 supports the automated generation of code based upon the business rule. The run-time code execution module 1130 executes the generated code during the operation of the warehouse management system.

The user interface and repository module 1110 allows the user to define and record business rules, using common business terms, into an organized set of logical conditions, preferences, measurements and effectivities. Once defined by the user, the organized set of logical conditions, preferences, measurements and effectivities, are automatically translated and implemented by the code generation module 1120 into an efficient set of code and operations to execute the process embodied in the business rule. The set of code and operations can then be automatically invoked by the warehouse management system whenever a transaction 1150 (such as a request to find the optimal inventory holding to satisfy an order) is processed. When invoked by the warehouse management system, the run-time execution module 1130 selects an appropriate business rule embodied in the code for a particular requested transaction. The run-time execution module 1130 then combines data from a warehouse database 1140 with the business rule embodied in the code in order to determine an intelligent result 1160.

Hence, embodiment of the present invention provide for a highly flexible way of defining and then implementing business rules, without having to resort to customization by the warehouse management system vendor or a third party software programmer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented process for obtaining solutions for management of warehouse functions of a warehouse, comprising:
  under the control of at least one computer system configured with executable instructions,
    defining one or more hierarchical structured rules by at least:
      selecting one or more applicable criteria for each hierarchical structured rule;
      prioritizing the selected one or more applicable criteria;
      defining one or more strategies for the one or more hierarchical structured rules;
      defining one or more solutions for the one or more hierarchical structured rules;
      sequencing the defined one or more solutions;
      assigning the defined one or more solutions to one or more of the defined strategies;
      sequencing the defined one or more strategies; and
      assigning the defined one or more strategies to one or more of the selected one or more criteria;
    receiving specified attributes of a requested action;
    performing a hierarchical search of records of a database as a function of a hierarchical structured rule based upon the specified attributes, wherein the hierarchical structured rule comprises a prioritized criterion, a sequenced strategy assigned to the criterion, and a sequenced solution assigned to the strategy, wherein the prioritized criterion, the strategy and the solution each have a relationship with the other that involves one or more specified restrictions that are specified as a part of the hierarchical structured rule and used to complete a predetermined warehouse process and wherein the database comprises content information about a storage warehouse having physical items stored therein; and
    outputting a solution obtained from the database according to the specified attributes wherein said solution comprises a suggestion for performing a warehouse process involving inventory handling for the storage warehouse.

2. The computer implemented process according to claim 1, wherein the hierarchical search comprises:
  a) searching according to the prioritized criterion;
  b) searching according to the strategy, associated with the prioritized criterion;
  c) searching according to the solution, associated with the prioritized criterion and the strategy that match the specified attributes.

3. A warehouse management system for a warehouse for obtaining a solution to a requested management action, comprising:
  a) means for defining hierarchical structured rules, said defining hierarchical structured rules comprising:
    selecting one or more applicable criteria for each hierarchical structured rule;
    prioritizing the selected one or more applicable criteria;
    defining one or more strategies for each hierarchical structured rule;
    defining one or more solutions for each hierarchical structured rule wherein the criteria, the strategies and the solutions each have a relationship with the other that involves one or more specified restrictions that are specified as a part of the hierarchical structured rules and used to complete a predetermined warehouse process;

sequencing the defined solutions;

assigning the defined solutions to one or more of the defined strategies;

sequencing the defined strategies;

assigning the defined strategies to one or more of the selected criteria; and b) means for manipulating a database to provide the solution based upon the defined hierarchical structured rules and the requested management action, wherein the database comprises content information about a storage warehouse having physical items stored therein, wherein said solution comprises a suggestion for performing a warehouse process involving inventory handling.

4. The means for defining rules of claim 3, further comprising:

a) means for specifying one or more entities for each rule; and b) means for specifying one or more rule types for each of the rules.

5. The computer implemented process according to claim 1, wherein the requested action comprises a pick request.

6. The computer implemented process according to claim 1, wherein the requested action comprises a put away request.

7. The computer implemented process according to claim 1, wherein the requested action comprises a move order.

8. The computer implemented process according to claim 1, wherein the requested action comprises a cost group request.

9. The computer implemented process according to claim 1, wherein the requested action comprises a material reservation.

10. The computer implemented process according to claim 1, wherein the solution comprises a pick suggestion.

11. The computer implemented process according to claim 1, wherein the solution comprises a put away suggestion.

12. The computer implemented process according to claim 1, wherein the solution comprises a task type assignment.

13. The computer implemented process according to claim 1, wherein the solution comprises a cost group assignment.

14. The computer implemented process according to claim 1, wherein the solution comprises a label format assignment.

15. The computer implemented process according to claim 1, wherein the prioritized criterion includes standards upon which the solution is selected based upon the hierarchical structured rule.

16. The computer implemented process according to claim 1, wherein the strategy comprises a sequence of solutions.

17. The computer implemented process according to claim 1, wherein at least one of said one or more specified restrictions specifies a time period during which the solution is valid.

18. The computer implemented process according to claim 1, wherein the requested action is related to handling of inventory in the storage warehouse.

19. A computer-readable storage medium having stored thereon instructions for operating a warehouse management system for obtaining a solution to a requested management action, the instructions comprising:

instructions that cause one or more processors to define hierarchical structured rules, by at least:

selecting one or more applicable criteria for each hierarchical structured rule;

prioritizing the selected one or more applicable criteria;

defining one or more strategies for each hierarchical structured rule;

defining one or more solutions for each hierarchical structured rule wherein the criteria, the strategies and the solutions each have a relationship with the other that involves one or more specified restrictions that are specified as a part of the hierarchical structured rules and used to complete a predetermined warehouse process;

sequencing the defined solutions;

assigning the defined solutions to one or more of the defined strategies;

sequencing the defined strategies;

assigning the defined strategies to one or more of the selected criteria; and instructions that cause the one or more processors to manipulate a database to provide the solution based upon the defined hierarchical structured rules and the requested management action, wherein the database comprises content information about a storage warehouse having physical items stored therein, wherein said solution comprises a suggestion for performing a warehouse process involving inventory handling.

20. The computer-readable storage medium of claim 19, further comprising:

instructions that cause the one or more processors to specify one or more entities for each rule; and instructions that cause the one or more processors to specify one or more rule types for each of the rules.

21. The computer-readable storage medium of claim 19, wherein the requested action comprises a pick request.

22. The computer-readable storage medium of claim 19, wherein the requested action comprises a put away request.

23. The computer-readable storage medium of claim 19, wherein the requested action comprises a move order.

24. The computer-readable storage medium of claim 19, wherein the requested action comprises a cost group request.

25. The computer-readable storage medium of claim 19, wherein the requested action comprises a material reservation.

26. The computer-readable storage medium of claim 19, wherein the solution comprises a pick suggestion.

27. The computer-readable storage medium of claim 19, wherein the solution comprises a put away suggestion.

28. The computer-readable storage medium of claim 19, wherein the solution comprises a task type assignment.

29. The computer-readable storage medium of claim 19, wherein the prioritized criterion includes standards upon which the solution is selected based upon the hierarchical structured rule.

30. The computer-readable storage medium of claim 19, wherein at least one of said one or more specified restrictions specifies a time period during which the solution is valid.

* * * * *

UNITED STATES PATENT AND TRADEMARK OFFICE
CERTIFICATE OF CORRECTION

PATENT NO. : 7,809,676 B2  Page 1 of 1
APPLICATION NO. : 10/158176
DATED : October 5, 2010
INVENTOR(S) : Jon S. Chorley et al.

It is certified that error appears in the above-identified patent and that said Letters Patent is hereby corrected as shown below:

On sheet 5 of 13, in Figure 5, Box No. 350, line 2, delete "COMINGLE" and insert -- COMMINGLE --, therefor.

On sheet 5 of 13, in Figure 5, Box No. 420, line 3, delete "COMINGLE" and insert -- COMMINGLE --, therefor.

In column 4, line 41, before "criteria" delete "iii".

In column 4, line 67, delete "comingle," and insert -- commingle, --, therefor.

In column 5, line 6, delete "comingle" and insert -- commingle --, therefor.

In column 5, line 20-21, delete "comingle" and insert -- commingle --, therefor.

In column 11, line 12, delete "away" and insert -- aways --, therefor.

Signed and Sealed this
Seventh Day of June, 2011

David J. Kappos
*Director of the United States Patent and Trademark Office*